No. 890,727. PATENTED JUNE 16, 1908.
R. A. TODD.
CIRCULAR SAW JOINTER AND SIDE FILER.
APPLICATION FILED AUG. 8, 1907.
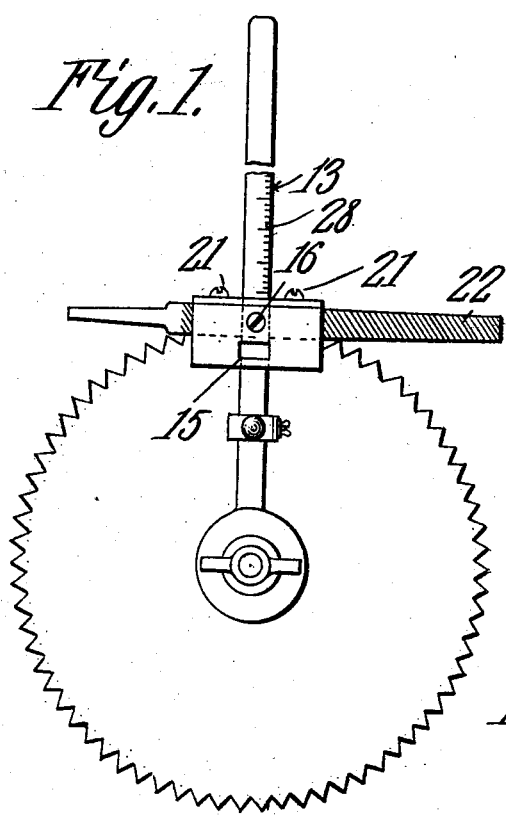
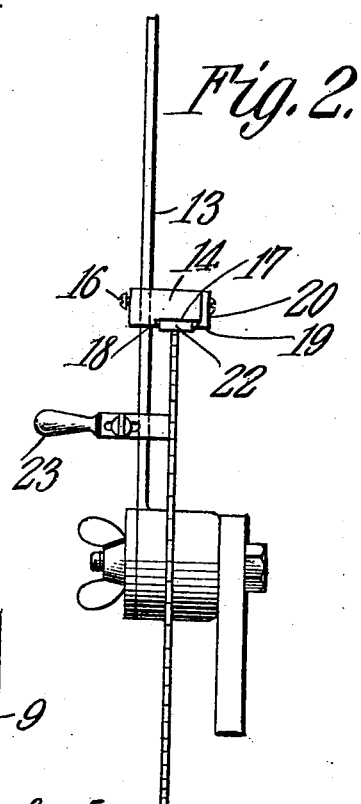
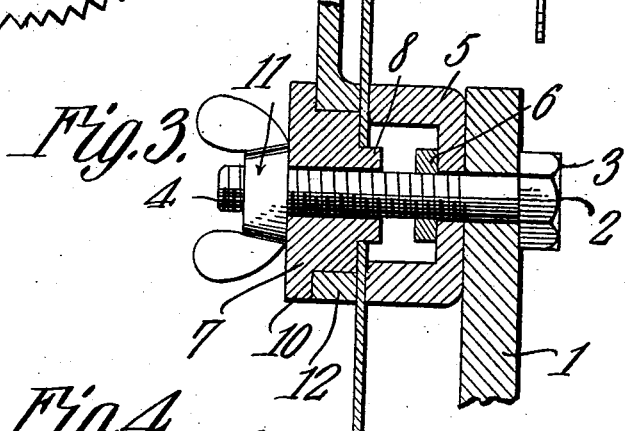
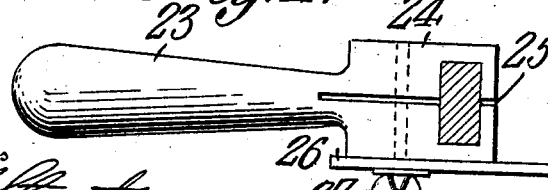
Robert A. Todd,
Inventor.

UNITED STATES PATENT OFFICE.

ROBERT A. TODD, OF MASSENA, NEW YORK.

CIRCULAR-SAW JOINTER AND SIDE-FILER.

No. 890,727.   Specification of Letters Patent.   Patented June 16, 1908

Application filed August 8, 1907. Serial No. 387,696.

*To all whom it may concern:*

Be it known that I, ROBERT A. TODD, a citizen of the United States, residing at Massena, in the county of St. Lawrence and State of New York, have invented a new and useful Circular-Saw Jointer and Side-Filer, of which the following is a specification.

This invention has reference to improvements in circular saw jointers and side filers, and its object is to provide a means whereby a saw may be readily jointed, or a number of saws may be jointed one after the other to the same size, and it may also be side filed.

The invention comprises a holder to be attached to a bench or other support and comprising one member of a clamp, the other member of which is composed of a block having a projection fitting the arbor hole of the saw and carrying an arm rotatable with reference to the saw, upon which arm there is an adjustable file carrier so mounted upon the arm that it may be removed therefrom and replaced in a different position, so that the file may be brought into position to joint the saw tooth or may be brought against the sides of the teeth for side filing. The holder for the file is so made as to carry an ordinary file such as found on the market and no special type or shape of file is necessary. Furthermore, the arm is provided with a handle on which is a gage for regulating the distance between the arm and saw for side filing, and by means of this handle the arm may be carried completely around the saw. By means of the clamp device, it is not necessary to carry the saw arbor to the filing bench, since the saw may be slipped off the arbor and another sharp saw put in its place, while the saw filer is at work upon the dull saw. These several advantages of the present invention, as well as other advantages, will appear from the following detailed description, taken in connection with the accompanying drawings forming part of the specification, in which, Figure 1 is a side elevation of the device as applied to a circular saw. Fig. 2 is an end elevation of the same. Fig. 3 is a section through the saw clamp and parts immediately adjacent thereto, some of the parts being in elevation, and Fig. 4 is a detail view of the handle as applied to the file carrying arm, the said arm being shown in section.

Referring to the drawings, there is shown a part 1 which may be taken as illustrative of a bench or other fixed support, and fast to this part 1 is a bolt 2 having a head 3 at one end and having its threaded end 4 extending through and beyond the bench. On that side of the bench remote from the head 3, the bolt carries a cup-shaped clamp member 5, which may be held in place by a nut 6 screwed on to the threaded end 4 of the bolt and confining the cup-shaped clamp member 5 against the bench 1. The other member of the clamp consists of a stepped block 7 provided with a central perforation through which is passed the threaded end 4 of the bolt 2. This block has a central axial hub or projection 8 of such size as to receive a saw 9 after the same has been removed from its arbor, and for saws having eyes of different sizes, blocks 7 having hubs 8 of corresponding size may be used. The cup member 5 of the clamp is of such internal diameter as to receive hubs 8 of various sizes, while at the same time this clamp member will confine the saw between its outer end and the block 7. The outer end of the block 7 is provided with a peripheral flange 10 of a diameter about the same as that of the diameter of the clamp member 5, and a wing nut 11 is provided to screw upon the threaded end 4 of the bolt 2 and force the block 7 in a direction to clamp the saw to the clamp member 5.

The exterior of the block 7 is circular in outline, and seated thereon and confined between the flange 10 and the saw 9 is a collar 12 free to turn about the block 7 and extending radially from this collar so as to lie substantially parallel with the saw 9 is an arm 13 of sufficient length to extend radially across and beyond the periphery of the largest saw for which the apparatus is designed. This arm is preferably rectangular in cross section and fitted to the same so as to be moved longitudinally on the arm to any desired point of adjustment is a rectangular block 14 through which extend perforations at right angles to each other for the passage of the said arm. One of these perforations is shown at 15 in Fig. 1. Adjacent to the perforation 15 is a set screw 16 by means of which the block 14 may be secured tightly to the arm when the desired degree of radial adjustment has been obtained.

The block 14 is provided on one side with a recess 17 one wall 18 of which may be undercut or dovetailed, and the other wall of this recess is formed by the dovetailed end 19 of the plate 20 held to the block by screws 20. The recess 17 is of such a size as to receive an ordinary file 22 such as is commonly found upon the market. When such a file is placed in the recess 17 with one of its longitudinal edges against the dovetailed or undercut wall 18, and the plate 20 is brought with its dovetailed edge 19 into engagement with the other longitudinal edge of the file, sufficient pressure may be brought to bear by means of the screws 21 to clamp the file firmly in place.

Applied to the arm 13 is a handle 23 terminating in a head 24 split longitudinally, as shown at 25, and provided with a through perforation for the passage of the arm 13. On one side of the head 24 is provided a gage plate 26, and a thumb screw 27, passing through the plate 26 and also through the head 24 so as to engage a nut therein, serves to clamp the gage plate in place at any degree of projection beyond the end of the head 24, and at the same time causes the head 24 to firmly clamp the arm 13.

Instead of having the thumb screw 27, the head thereof may be in the form of a wing nut and the body may simply pass through the head 24, being fast in one side thereof, and threaded at the other end to receive the wing nut, the action being the same as in the case of a thumb screw.

When it is desired to joint and side file a saw, the latter is removed from the arbor and clamped as heretofore described between the cup 5 and block 7. The block 14 with the file 22 secured therein is now adjusted upon the arm 13 until it rests upon the outer ends of the teeth of the saw. Now, by means of the handle 23, the arm 13 is caused to move about the axis of the block 7 and ultimately the saw teeth are all brought to the same length and all equi-distant from the axis of the saw. The arm 13 is provided with graduations, as indicated at 28, so that when it is desirable to treat saws of the same size, they may all be accurately jointed, since the block 14 may be brought to the same position upon the arm 13 as many times as may be necessary. Now, let it be assumed that the saw is to be side filed. The block 14 is removed from the arm 13 and turned so as to be replaced thereon in a position at right angles to the first position, that is, with the active face of the file parallel with the side of the saw, or substantially so. Now, by suitably adjusting the gage plate 26, the file may be brought into operative relation to the sides of the teeth and there maintained while the arm 13 is moved about its axis to reach all the saw teeth.

By means of the present invention, there is no loss of time when saws are sharpened, since the saws to be treated are removed entirely from their arbors, and it is unnecessary to await the filing of the saw, since a sharp saw may be immediately put on the arbor in place of the dull saw, and the latter can be treated at leisure. Furthermore, the clamping means provide a saw clamp that will replace the regular vise, and the file holder may be simply turned to a pendent position out of the way of the operator. Moreover, the file holding means will take an ordinary commercial file and no special type or shape of file is necessary.

What is claimed is:—

1. In a mechanism of the class described, a saw clamp comprising a cup-shaped member having a saw engaging face, another member having a saw engaging face directly opposed to the saw engaging face of the cup-shaped member to clamp the saw, said second member also having saw centering means coöperating with the eye of the saw, and a clamp screw for forcing the clamp members into operative relation to the saw, and a file holder mounted upon the second-named member of the clamp and movable about the axis thereof.

2. In mechanism of the class described, a saw clamp comprising a cup-shaped member having a saw engaging face, another member having a saw engaging face directly opposed to the saw engaging face of the cup-shaped member to clamp the saw, the second-named member also having an axial hub or extension adapted to coöperate with the eye of the saw to center said saw, and arranged to enter said cup-shaped member, the second-named member also having a peripheral flange spaced from the saw, and a file holding arm seated on the second-named member between the saw and the flange on the said member.

3. In mechanism of the class described, a saw clamp, an arm mounted thereon for rotation about the axis of the saw held by the clamp, and a block provided with means for holding a file, and provided with through passages at right angles one to the other whereby the block may be placed upon and adjusted longitudinally on the arm in positions at right angles one to the other.

4. In mechanism of the class described, a saw clamp, an arm mounted thereon for rotation about the axis of the saw held by the clamp and projecting radially with relation to the saw, and a block having through passages at right angles to each other for the arm, said block having a recess on one side and a clamp plate coöperating with said recess to clamp a file therein.

5. In mechanism of the class described, a clamp for a saw to be treated, an arm mounted thereon for rotation by the axis of the saw held by the clamp and projecting radially with relation to the saw but spaced therefrom, a file holder carried by the arm, a handle also carried by the arm and movable thereon, a gage plate carried by the handle and adjustable with relation to the adjacent face of the saw, and a clamp screw for the gage plate also serving as a clamp screw for the handle to hold it to the arm.

In testimony that I claim the foregoing as my own, I have hereto affixed my signature in the presence of two witnesses.

ROBERT A. TODD.

Witnesses:
CHARLES J. HOYT,
JAMES W. WEBB.